US009602182B2

(12) United States Patent
Zhang et al.

(10) Patent No.: US 9,602,182 B2
(45) Date of Patent: Mar. 21, 2017

(54) BASEBAND PROCESSING APPARATUS IN RADIO COMMUNICATION SYSTEM AND RADIO COMMUNICATION

(71) Applicant: Huawei Technologies Co., Ltd., Shenzhen (CN)

(72) Inventors: Jinfang Zhang, Shanghai (CN); Bojie Li, Shanghai (CN); Lei Lu, Shanghai (CN); Hongning Wu, Shenzhen (CN); Jianjun Wu, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 61 days.

(21) Appl. No.: 14/598,342

(22) Filed: Jan. 16, 2015

(65) Prior Publication Data

US 2015/0124769 A1 May 7, 2015

Related U.S. Application Data

(63) Continuation of application No. PCT/CN2013/070144, filed on Jan. 7, 2013.

(30) Foreign Application Priority Data

Jul. 24, 2012 (CN) .......................... 2012 1 0256870

(51) Int. Cl.
*H04J 11/00* (2006.01)
*H04B 7/04* (2006.01)
(Continued)

(52) U.S. Cl.
CPC ........... *H04B 7/0478* (2013.01); *H04B 7/024* (2013.01); *H04B 7/0413* (2013.01);
(Continued)

(58) Field of Classification Search
CPC .... H04W 76/025; H04W 92/10; H04W 92/20
(Continued)

(56) References Cited

U.S. PATENT DOCUMENTS 8,204,470 B2 * 6/2012 Onggosanusi ......... H04B 7/024
370/334
8,588,324 B2 * 11/2013 Mondal .................. H04B 7/024
370/252
(Continued)

FOREIGN PATENT DOCUMENTS

| CN | 101373998 A | 2/2009 |
| CN | 101516139 A | 8/2009 |

(Continued)

OTHER PUBLICATIONS

Alcatel-Lucent, Multipoint CSI feedback, 3GPP, R1-113318, Oct. 2011, pp. 1-3.*

(Continued)

*Primary Examiner* — Dmitry H Levitan
(74) *Attorney, Agent, or Firm* — Conley Rose, P.C.

(57) ABSTRACT

A baseband processing apparatus in a radio communication system, a radio communication system, and a baseband processing method. The apparatus includes a first unit and a second unit that implement different baseband processing functions, where the second unit is configured to generate a precoding matrix of a downlink coordinated multipoint transmission and reception (CoMP) user, generate precoding control information according to the precoding matrix, and send the precoding control information to the first unit; and the first unit is configured to receive the precoding control information sent by the second unit, and perform downlink joint baseband processing on downlink CoMP user data in downlink user data according to the precoding control information, so as to generate jointly sent baseband data for radio sending. The technical solutions can reduce transmis- (Continued)

sion bandwidth between baseband processing units and obtain a system capacity gain at the same time.

19 Claims, 8 Drawing Sheets

(51) Int. Cl.
| | |
|---|---|
| *H04L 1/00* | (2006.01) |
| *H04L 5/00* | (2006.01) |
| *H04L 25/03* | (2006.01) |
| *H04B 7/02* | (2006.01) |
| *H04W 72/04* | (2009.01) |
| *H04W 28/06* | (2009.01) |
| *H04W 72/00* | (2009.01) |

(52) U.S. Cl.
CPC .......... *H04L 1/0077* (2013.01); *H04L 5/0035* (2013.01); *H04L 25/03949* (2013.01); *H04W 72/0406* (2013.01); *H04W 28/06* (2013.01); *H04W 72/00* (2013.01)

(58) Field of Classification Search
USPC .................................. 370/203, 310, 328, 329
See application file for complete search history.

(56) References Cited

U.S. PATENT DOCUMENTS

| | | | | |
|---|---|---|---|---|
| 8,599,810 | B2* | 12/2013 | Sun | H04B 7/024 370/338 |
| 8,818,385 | B2* | 8/2014 | Hui | 455/127.1 |
| 8,867,477 | B2* | 10/2014 | Song | H04B 7/0632 370/328 |
| 8,934,557 | B2* | 1/2015 | Cavalcante | H04B 7/024 370/252 |
| 9,203,490 | B2* | 12/2015 | Kim | H04L 1/0026 |
| 2011/0275376 | A1* | 11/2011 | Boldi | H04B 7/022 455/436 |
| 2012/0020319 | A1 | 1/2012 | Song et al. | |
| 2012/0134429 | A1 | 5/2012 | Hoymann et al. | |
| 2012/0183093 | A1* | 7/2012 | Zhu | H04B 7/024 375/285 |
| 2013/0100907 | A1 | 4/2013 | Liu | |

FOREIGN PATENT DOCUMENTS

| | | |
|---|---|---|
| CN | 101820631 A | 9/2010 |
| CN | 102130754 A | 7/2011 |
| CN | 102347820 A | 2/2012 |
| CN | 102546080 A | 7/2012 |
| EP | 2574138 A1 | 3/2013 |
| WO | 2010075865 A1 | 7/2010 |
| WO | 2010123313 A2 | 10/2010 |
| WO | 2012083718 A1 | 6/2012 |

OTHER PUBLICATIONS

Partial English Translation and Abstract of Chinese Patent Application No. CN101516139A, May 13, 2015, 3 pages.
Partial English Translation and Abstract of Chinese Patent Application No. CN101820631A, May 11, 2015, 25 pages.
Partial English Translation and Abstract of Chinese Patent Application No. CN102347820A, May 11, 2015, 14 pages.
Foreign Communication From a Counterpart Application, PCT Application No. PCT/CN2013/070144, English Translation of International Search Report dated May 2, 2013, 3 pages.
Foreign Communication From a Counterpart Application, PCT Application No. PCT/CN2013/070144, Written Opinion dated May 2, 2013, 4 pages.
Foreign Communication From a Counterpart Application, European Application No. 13823835.7, Extended European Search Report dated May 4, 2015, 8 pages.
Foreign Communication From a Counterpart Application, Chinese Application No. 201210256870.6, Chinese Office Action dated Sep. 2, 2016, 7 pages.
Foreign Communication From a Counterpart Application, Chinese Application No. 201210256870.6, Chinese Search Report dated Aug. 24, 2016, 2 pages.

* cited by examiner

| 30 | When an apparatus using the baseband processing method includes a first unit and a second unit that implement different baseband processing functions, the second unit generates a precoding matrix of a downlink CoMP user, generates precoding control information according to the precoding matrix, and sends the precoding control information to the first unit | ~S31 |

↓

The first unit performs downlink joint baseband processing on downlink CoMP user data in the downlink user data according to the precoding control information sent by the second unit, so as to generate jointly sent baseband data for sending ~S32

↓

The first unit sends uplink CoMP user data in the uplink user data to the second unit ~S33

↓

The second unit completes uplink joint baseband processing on the uplink CoMP user data sent by the first unit, so as to generate uplink transmission user data for non-physical layer processing, and generates the precoding matrix of the downlink CoMP user, generates the precoding control information according to the precoding matrix, and sends the precoding control information to the first unit ~S34

FIG. 3

BASEBAND PROCESSING APPARATUS IN RADIO COMMUNICATION SYSTEM AND RADIO COMMUNICATION

CROSS-REFERENCE TO RELATED APPLICATIONS

This application is a continuation of International Application No. PCT/CN2013/070144, filed on Jan. 7, 2013, which claims priority to Chinese Patent Application No. 201210256870.6, filed on Jul. 24, 2012, all of which are hereby incorporated by reference in their entireties.

TECHNICAL FIELD

The present invention relates to the field of radio communications, and in particular, to a baseband processing apparatus in a radio communication system, a radio communication system, and a baseband data processing method.

BACKGROUND

In a coordinated multipoint transmission and reception (CoMP) technology, coordinated transmission between multiple cells is used, which effectively solves a problem of interference of cell edges, thereby improving throughput of the cell edges and a system and broadening high-speed transmission coverage. CoMP includes downlink CoMP transmission and uplink CoMP reception. In the uplink CoMP reception, user data is jointly received by multiple cells so as to improve user throughput of the cell edges; and the downlink CoMP transmission may be divided into joint processing (JP) and coordinated scheduling/beam forming (CS/CB) according to whether service data can be obtained on multiple coordinated points. The JP may obtain a transmission gain, and the CS/CB can reduce interference between the cells.

To support different CoMP transmission manners, it is required to obtain user channel state information in different forms. There are three obtaining types: explicit feedback, implicit feedback, and channel estimation based on a sounding reference signal (SRS). The explicit feedback refers to that a terminal does not perform preprocessing on user channel state information, and feeds back information such as a channel coefficient. The implicit feedback refers to that a terminal performs, in a given condition, certain preprocessing on user channel state information and then feeds back the information to a base station, such as precoding matrix indicator information and channel rank indicator information. In a time division duplexing (TDD) system, channel reciprocity is further used to obtain equivalent downlink user channel state information according to an SRS sent by a terminal.

To adapt to increasingly fierce competition and a continuously growing throughput requirement, a coverage area of a radio base station becomes smaller and smaller. Deployment of a small base station is flexible. However, because each small base station works independently, a JP gain cannot be obtained. Recently, a radio access network system based on a cloud computing technology has attracted common attention of the industrial circle. In this architecture, baseband processing units (BBU) of multiple base stations are centralized to support large-scale JP, so as to improve system capacity, and system cost is reduced at the same time using resource statistical multiplexing. In the large-scale JP, it is required to return data of each remote radio frequency unit (RRU) from a long distance to a BBU resource pool. At present, a BBU, acting as a baseband processing unit, and an RRU are interconnected through an interface such as a common public radio interface (CPRI), and a data transmission rate on the CPRI interface increases linearly with the number of antennas and a system bandwidth. For example, a bandwidth of a long term evolution (LTE) system is 20 megahertz (MHz), 8 antennas are used, and transmission traffic reaches 10 gigabits per second (Gbps). Such a high transmission bandwidth requirement brings a large challenge to an existing transmission network of an access layer, and an operator without abundant optical fiber resources has difficulties in deployment. To lower the transmission bandwidth requirement on the CPRI, multiple technologies are developed. However, a technology which not only can reduce the transmission bandwidth on the CPRI but also can obtain a system capacity gain at the same time is still in need.

SUMMARY

Embodiments of the present invention provide a baseband processing apparatus in a radio communication system and a radio communication system, which can reduce a transmission bandwidth between baseband processing units and obtain a system capacity gain at the same time.

In a first aspect, a baseband processing apparatus in a radio communication system is provided, which includes a first unit and a second unit that implement different baseband processing functions, where the second unit is configured to generate a precoding matrix of a downlink CoMP user, generate precoding control information according to the precoding matrix, and send the precoding control information to the first unit; and the first unit is configured to receive the precoding control information sent by the second unit, obtain uplink user data and downlink user data, and perform downlink joint baseband processing on downlink CoMP user data in the downlink user data according to the precoding control information, so as to generate jointly sent baseband data for radio sending; the first unit is further configured to send uplink CoMP user data in the uplink user data to the second unit; and the second unit is further configured to complete uplink joint baseband processing on the uplink CoMP user data sent by the first unit, so as to generate user data for non-physical layer processing.

In combination with the first aspect, in a first possible implementation manner, the first unit includes a receiving module, a coding and decoding module, and a sending module, where the receiving module is configured to receive the precoding control information sent by the second unit; the coding and decoding module of the first unit is configured to perform precoding processing according to the downlink CoMP user data in the downlink user data and the precoding control information sent by the second unit and received by the receiving module, so as to generate the jointly sent baseband data for radio sending; and the sending module of the first unit is configured to send the uplink CoMP user data in the uplink user data before demodulation to the second unit.

In combination with the first aspect, in a second possible implementation manner, the second unit includes a receiving module, a demodulation module, a decoding module, a precoding matrix generating module, a control information generating module, and a sending module, where the receiving module of the second unit receives the uplink CoMP user data sent by the first unit; the demodulation module demodulates the uplink CoMP user data received by the receiving module and sends data after demodulation to the decoding module; the decoding module decodes the data after demodulation that is sent by the demodulation module, so as to send data after decoding to a functional unit of media access control (MAC) layer and/or upper layer, where the functional unit of MAC layer and/or upper layer is configured to implement a protocol function of a non-physical layer; the precoding matrix generating module generates a CoMP precoding matrix according to user channel state information and sends the CoMP precoding matrix to the control information generating module; the control information generating module generates the precoding control information according to the CoMP precoding matrix, and sends the precoding control information to the sending module; and the sending module sends the precoding control information to the first unit.

In combination with the second possible implementation manner of the first aspect, in a third possible implementation manner, the user channel state information used by the precoding matrix generating module of the second unit includes one or more of the following information: a channel coefficient fed back by a terminal, precoding matrix indicator information fed back by the terminal, channel rank indicator information fed back by the terminal, and a downlink channel coefficient estimated using channel reciprocity and according to an uplink SRS sent by the terminal.

In combination with the first aspect, in a fourth possible implementation manner, the first unit is further configured to perform downlink baseband processing on downlink non-CoMP user data in the downlink user data obtained from a network side, so as to generate baseband data for radio sending; and the first unit is further configured to perform uplink baseband processing on uplink non-CoMP user data in the uplink user data received from an air interface, and send data obtained after processing to a functional unit of MAC layer and/or upper layer, where the functional unit of MAC layer and/or upper layer is configured to implement a protocol function of a non-physical layer.

In a second aspect, a radio communication system is provided, where the radio communication system includes a central processing node and a transceiver node. The central processing node includes a second unit of the baseband processing apparatus and a functional unit of MAC layer and/or upper layer, where the functional unit of MAC layer and/or upper layer of the central processing node is configured to implement a protocol function of a non-physical layer; the transceiver node includes a first unit of the baseband processing apparatus and a radio frequency unit, where the radio frequency unit is configured to receive joint sent baseband data generated by the first unit, so as to generate a radio signal and receive and send a radio signal, the first unit of the transceiver node and the second unit of the central processing node implement different baseband processing functions, and the functional unit of MAC layer and/or upper layer is further configured to receive, from the second unit, uplink CoMP user data that has undergone joint baseband processing, receive, from the first unit, uplink non-CoMP user data that has undergone uplink baseband processing, and send downlink CoMP user data and downlink non-CoMP user data to the first unit. Alternatively, the central processing node includes a first unit and a second unit of the baseband processing apparatus, a functional unit of MAC layer and/or upper layer, and a radio frequency unit, where the functional unit of MAC layer and/or upper layer of the central processing node is configured to implement a protocol function of a non-physical layer, and is further configured to receive, from the second unit, uplink CoMP user data that has undergone joint baseband processing, receive, from the first unit of the central processing node, uplink non-CoMP user data that has undergone uplink baseband processing, and send downlink CoMP user data and downlink non-CoMP user data to the first unit of the central processing node, the radio frequency unit is configured to implement generating and receiving and sending of a radio signal, and the first unit and the second unit of the central processing node are configured to implement different baseband processing functions; and the transceiver node includes a first unit of the baseband processing apparatus, a radio frequency unit, and a functional unit of MAC layer and/or upper layer, where the functional unit of MAC layer and/or upper layer of the transceiver node is configured to implement a protocol function of a non-physical layer, and is further configured to receive, from the second unit, uplink CoMP user data that has undergone joint baseband processing, receive, from the first unit of the transceiver node, uplink non-CoMP user data that has undergone uplink baseband processing, and send non-CoMP user data in downlink user data to the first unit of the transceiver node, the radio frequency unit is configured to implement generating and receiving and sending of a radio signal, and the first unit of the transceiver node and the second unit of the central processing node are configured to implement different baseband processing functions.

In a third aspect, a baseband data processing method is provided for processing baseband data in a radio communication system, where the method includes obtaining uplink user data and downlink user data; generating, through a second unit, a precoding matrix of a downlink CoMP user, and generating precoding control information according to the precoding matrix; sending the precoding control information to a first unit, where the first unit and the second unit are set independently; performing, using the first unit, downlink joint baseband processing on downlink CoMP user data in the downlink user data according to the precoding control information, so as to generate jointly sent baseband data for radio sending; and sending, using the first unit, uplink CoMP user data in the uplink user data to the second unit, and completing, using the second unit, uplink joint baseband processing on the uplink CoMP user data sent by the first unit, so as to generate uplink transmission user data for non-physical layer processing.

In combination with the third aspect, in a first possible implementation manner, the completing, using the second unit, joint baseband processing on the uplink CoMP user data sent by the first unit includes demodulating, by the second unit, the uplink CoMP user data, so as to obtain data after demodulation; and decoding, by the second unit, the data after demodulation, so as to send data after decoding to a functional unit of MAC layer and/or upper layer, where the functional unit of MAC layer and/or upper layer is configured to implement a protocol function of a non-physical layer.

In a fourth aspect, a baseband data processing method is provided for processing baseband data in a radio communication system, where the method includes generating a precoding matrix of a downlink CoMP user, generating precoding control information according to the precoding matrix, and sending the precoding control information to a first unit, so that the first unit performs downlink joint baseband processing on downlink CoMP user data in downlink user data according to the precoding control information, so as to generate jointly sent baseband data for radio sending; and receiving uplink CoMP user data in uplink user data sent by the first unit, and completing uplink joint baseband processing on the uplink CoMP user data sent by the first unit, so as to generate uplink transmission user data for non-physical layer processing.

In combination with the fourth aspect, in a first possible implementation manner, the completing uplink joint baseband processing on the uplink CoMP user data sent by the first unit includes demodulating the uplink CoMP user data, to obtain data after demodulation; and decoding the data after demodulation, so as to send data after decoding to a functional unit of MAC layer and/or upper layer, where the functional unit of MAC layer and/or upper layer is configured to implement a protocol function of a non-physical layer.

In a fifth aspect, a baseband data processing method is provided for processing baseband data in a radio communication system, where the method includes receiving precoding control information sent by a second unit, and performing downlink joint baseband processing on downlink CoMP user data in downlink user data according to the precoding control information, so as to generate jointly sent baseband data for radio sending; and sending uplink CoMP user data in uplink user data to the second unit, so that the second unit completes uplink joint baseband processing on the uplink CoMP user data sent by the first unit, so as to generate user data for a functional unit of MAC layer and/or upper layer to perform non-physical layer processing.

In combination with the fifth aspect, in a first possible implementation manner, the performing downlink joint baseband processing on downlink CoMP user data in downlink user data according to the precoding control information, so as to generate jointly sent baseband data for radio sending includes performing precoding processing according to the downlink CoMP user data in the downlink user data and the precoding control information, so as to generate the jointly sent baseband data for radio sending.

The embodiments of the present invention can provide a baseband processing apparatus in a radio communication system, a radio communication system, and a baseband data processing method, where a CoMP baseband processing function is implemented in coordination through the first unit and the second unit in the baseband processing apparatus according to the architecture of the first unit and the second unit in the baseband processing apparatus, downlink precoding control information and uplink CoMP user data are transmitted between the first unit and the second unit, and the transmission bandwidth is much less than a transmission bandwidth required in transmission pre-coded data between the first unit and the second unit, so that a radio communication system using the apparatus can reduce a transmission bandwidth between baseband processing units and obtain a system capacity gain at the same time.

BRIEF DESCRIPTION OF DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and persons of ordinary skill in the art may still derive other drawings from the accompanying drawings without creative efforts.

FIG. 3 is a schematic flow chart of a baseband processing method in a radio communication system according to an embodiment of the present invention;

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by persons of ordinary skill in the art based on the embodiments in the present invention without creative efforts shall fall within the protection scope of the present invention.

The technical solutions of the present invention may be applied in various multiple input multiple output (MIMO) communication systems, such as a wideband code division multiple access (WCDMA) system, high-speed downlink packet access (HSDPA), a LTE system, a worldwide interoperability for microwave access (WiMAX) system, and a wireless fidelity (WiFi) system (for example, based on the IEEE802.11n standard).

A user equipment (UE), which may also be referred to as mobile terminal or mobile user equipment, may communicate with one or more core networks through a radio access network (RAN). The user equipment may be a mobile terminal such as a mobile phone (or referred to as "cellular" phone) and a computer with a mobile terminal, for example, a portable, pocket, handheld, computer built-in, or vehicle-mounted mobile apparatus, which exchanges languages and/or data with the RAN.

A base station may be a base station in the WCDMA (NodeB), and may further be an evolved base station in the LTE (evolved NodeB, eNB or e-NodeB) or a base station in the WiMAX, which is not limited in the present invention. For ease of description, however, an e-NodeB is taken as an example for description in the following embodiments.

In addition, terms "system" and "network" in this specification may be interchangeable. A term "and/or" in this specification is only an association relationship for describing associated objects, and represents that three relationships may exist, for example, A and/or B may represent the following three cases: A exists alone, both A and B exist, and B exists alone. In addition, the character "/" in this specification usually represents that the former and later associated objects are in a "or" relationship.

An embodiment of the present invention provides a baseband processing apparatus, where a baseband processing unit in the apparatus may be included in different nodes in a radio communication system, thereby reducing a transmission bandwidth between baseband processing units, and supporting the CoMP.

Figure 1A:
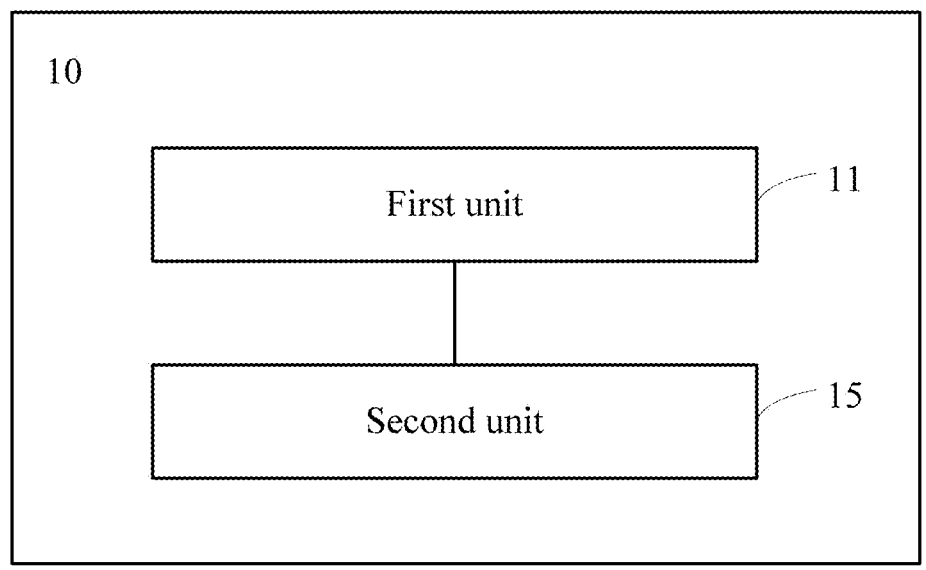
FIG. 1A and FIG. 1B are schematic block diagrams of a baseband processing apparatus in a radio communication system according to an embodiment of the present invention.

FIG. 1A is a block diagram of a baseband processing apparatus 10 in a radio communication system according to an embodiment of the present invention. As shown in FIG. 1A, the baseband processing apparatus 10 includes a first unit 11 and a second unit 15 that implement different baseband processing functions.

The second unit 15 is configured to generate a precoding matrix of a downlink CoMP user, generate precoding control information according to the precoding matrix, and send the precoding control information to the first unit.

The first unit 11 is configured to receive the precoding control information sent by the second unit 15, obtain uplink user data and downlink user data, and perform downlink joint baseband processing on downlink CoMP user data in the downlink user data according to the precoding control information, so as to generate jointly sent baseband data for radio sending, and the first unit 11 is further configured to send uplink CoMP user data in the uplink user data to the second unit 15.

In an embodiment, the downlink user data is obtained by the first unit 11 from a network side such as a radio network controller (RNC). In an embodiment, a radio frequency unit in the system receives the uplink user data from an air interface, and the first unit 11 obtains the uplink user data from the radio frequency unit. In addition, the second unit 15 is further configured to complete uplink joint baseband processing on the uplink CoMP user data sent by the first unit 11, so as to generate uplink transmission user data for non-physical layer processing, and, to generate uplink transmission user data for a functional unit of MAC layer and/or upper layer to perform non-physical layer processing.

CoMP user data refers to data processed using a CoMP technology, which includes uplink CoMP user data and downlink CoMP user data. The uplink CoMP user data refers to a union of user data received by multiple cells. The downlink CoMP user data refers to user data for jointly sending to the multiple cells. Usually, when CoMP user data is used, scheduling information or control information exists at the same time, indicating that the data is the CoMP user data.

The embodiment of the present invention provides a baseband processing apparatus, where a CoMP baseband processing function is implemented in coordination through the first unit and the second unit in the baseband processing apparatus according to the architecture of the first unit and the second unit in the baseband processing apparatus, thereby reducing interference between cells and improving system frequency spectrum efficiency, particularly in throughput of edge users, and obtaining a system capacity gain. Meanwhile, the baseband processing is implemented by two units, so that a radio communication system using the apparatus can reduce a transmission bandwidth between two baseband processing units with the minimum transmission traffic, thereby greatly reducing a requirement on transmission bandwidth. In the apparatus and the technical solutions, the uplink and downlink CoMP are implemented with the minimum transmission traffic, so the deployment cost of CoMP is reduced, and beneficial effects of reducing the interference between cells and improving the system frequency spectrum efficiency, particularly in the throughput of edge users, are obtained at the same time.

Optionally, the first unit 11 is further configured to perform downlink baseband processing on downlink non-CoMP user data in the downlink user data obtained from the network side, so as to generate baseband data for radio sending.

Optionally, the first unit 11 is further configured to perform uplink baseband processing on uplink non-CoMP user data in the uplink user data received from the air interface, and send data obtained after processing to a functional unit of MAC layer and/or upper layer, where the functional unit of MAC layer and/or upper layer is configured to implement a protocol function of a non-physical layer.

Figure 1B:
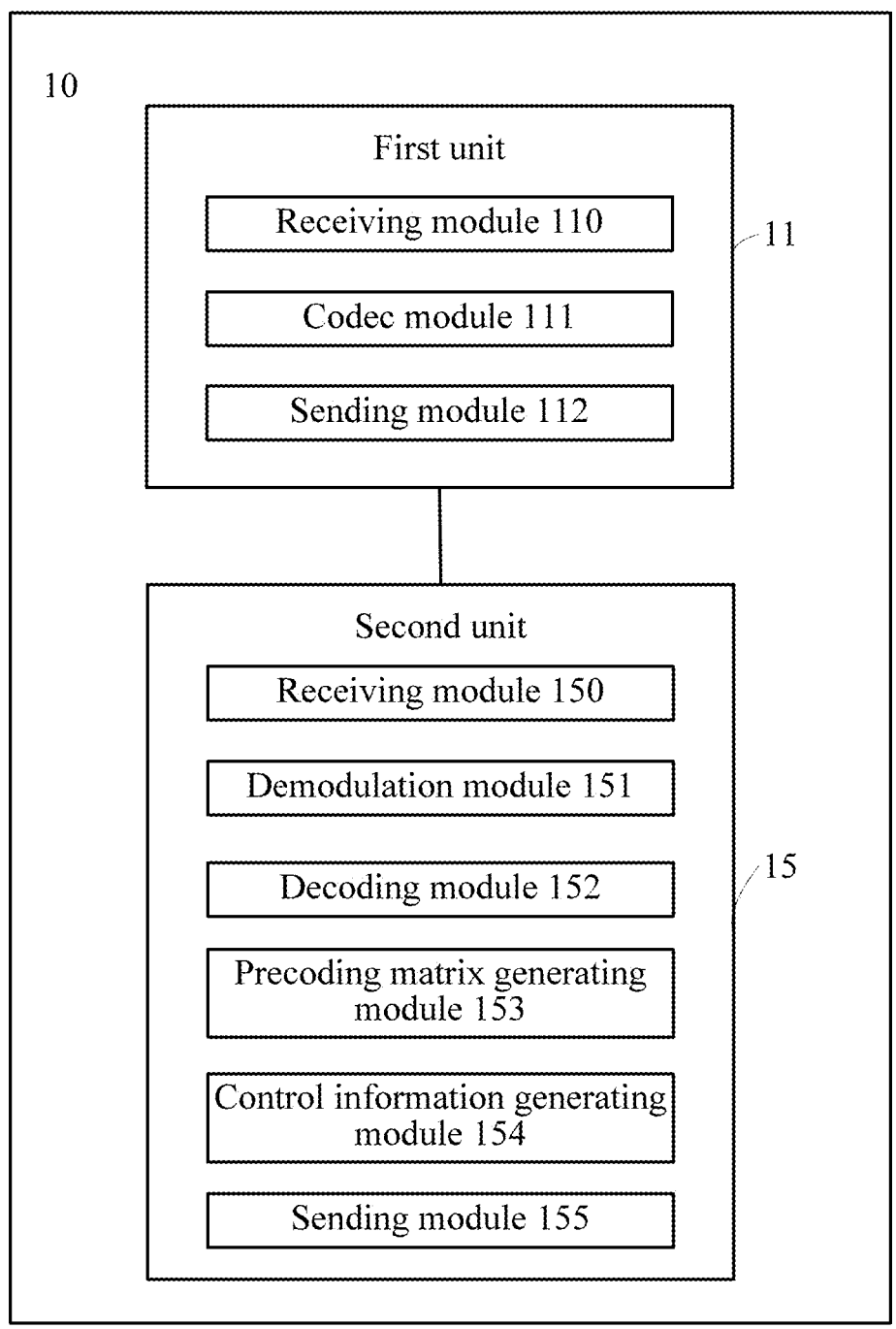

Optionally, as shown in FIG. 1B, the first unit 11 of the apparatus 10 includes a receiving module 110, a coding and decoding module 111, and a sending module 112.

The receiving module 110 is configured to receive the downlink CoMP user data in the downlink user data and the precoding control information sent by the second unit 15.

The coding and decoding module 111 of the first unit 11 is configured to perform precoding processing according to the downlink CoMP user data in the downlink user data and the precoding control information sent by the second unit 15 that are received by the receiving module, so as to generate the jointly sent baseband data for radio sending.

The sending module 112 of the first unit 11 sends the uplink CoMP user data in the uplink user data before demodulation to the second unit 15.

Optionally, as shown in FIG. 1B, the second unit 15 of the apparatus 10 includes a receiving module 150, a demodulation module 151, a decoding module 152, a precoding matrix generating module 153, a control information generating module 154, and a sending module 155.

The receiving module 150 of the second unit 15 receives the uplink CoMP user data sent by the first unit 11.

The demodulation module 151 demodulates the uplink CoMP user data received by the receiving module 150 and sends data after demodulation to the decoding module 152.

The decoding module 152 decodes the data after demodulation that is sent by the demodulation module 151, and sends data after decoding to a functional unit of MAC layer and/or upper layer, where the functional unit of MAC layer and/or upper layer is configured to implement a protocol function of a non-physical layer.

The precoding matrix generating module 153 generates a CoMP precoding matrix according to user channel state information and sends the CoMP precoding matrix to the control information generating module 154.

The control information generating module 154 generates the precoding control information according to the CoMP precoding matrix, and sends the precoding control information to the sending module 155. The sending module 155 sends the precoding control information to the first unit 11.

Optionally, the user channel state information used by the precoding matrix generating module 153 of the second unit 15 includes one or more of the following information: a channel coefficient fed back by a terminal, precoding matrix indicator information fed back by the terminal, channel rank indicator information fed back by the terminal, and a downlink channel coefficient obtained using channel reciprocity and according to an uplink SRS sent by the terminal.

Figure 2A:
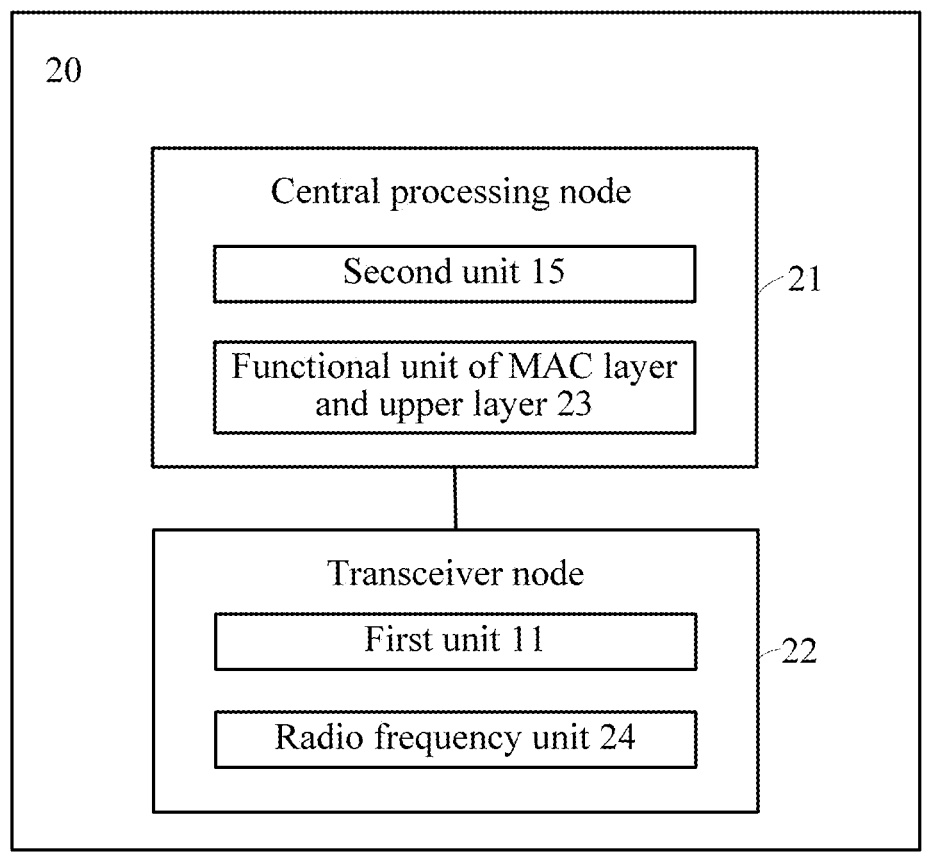
FIG. 2A and FIG. 2B are schematic block diagrams of a radio communication system according to an embodiment of the present invention.
Figure 2B:
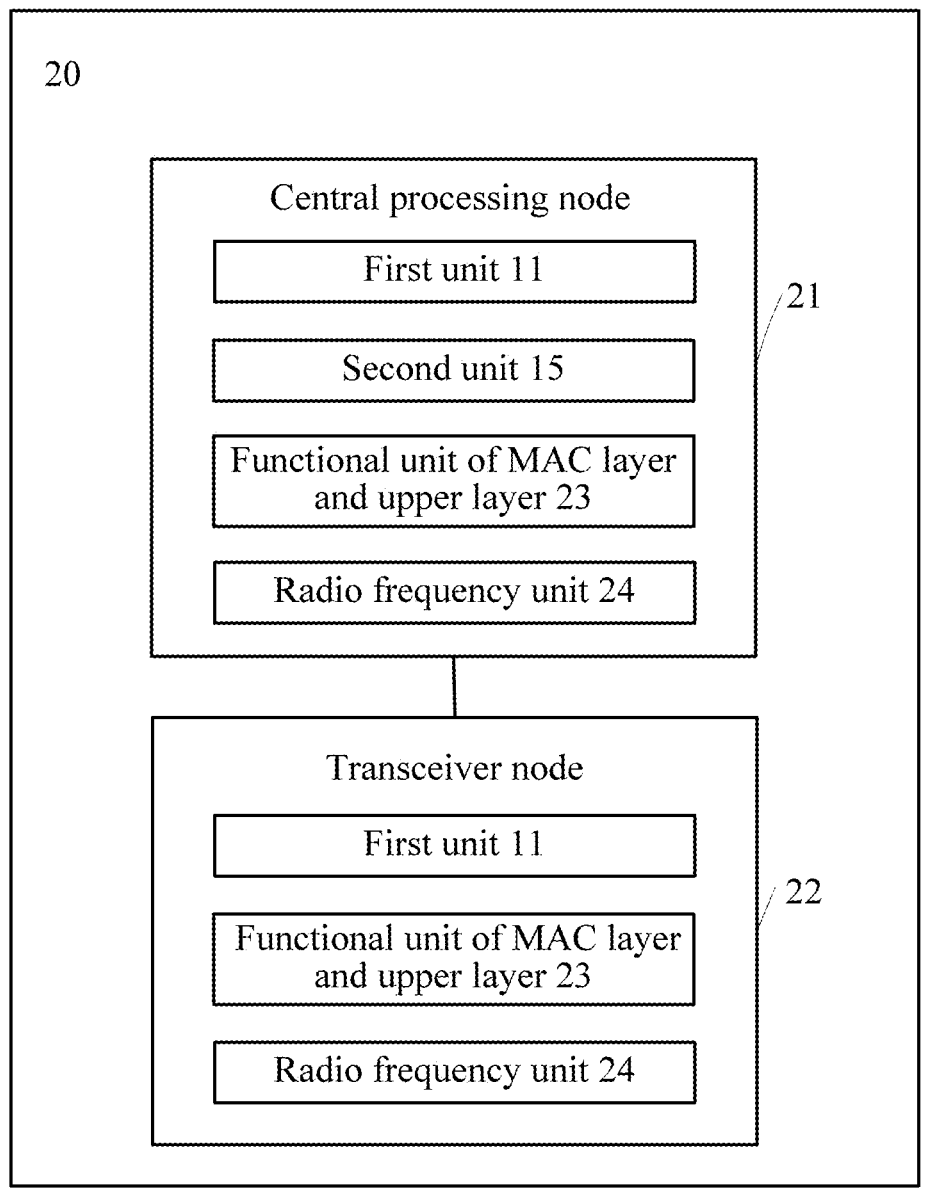

For different application scenarios, the baseband processing apparatus of the embodiment of the present invention may be implemented in radio communication systems in different architecture. FIG. 2A and FIG. 2B are schematic block diagrams of a radio communication system 20 according to an embodiment of the present invention.

Optionally, as shown in FIG. 2A, the radio communication system 20 includes a central processing node 21 and a transceiver node 22. The central processing node 21 includes a second unit 15 of the baseband processing apparatus 10 and a functional unit of MAC layer and/or upper layer 23, where the functional unit of MAC layer and/or upper layer 23 of the central processing node 21 is configured to implement a protocol function of a non-physical layer. The functional unit of MAC layer and/or upper layer 23 implements protocols of a data link layer and an upper layer of the data link layer in the open systems interconnection (OSI) 7-layer protocol, and during physical implementation, the functional unit of MAC layer and/or upper layer 23 may correspond to one or more units. For ease of description and highlighting of the technical solutions of the embodiment of the present invention, during function division, the functional unit of MAC layer and/or upper layer 23 is defined as one functional unit here, but it is not limited in the embodiment of the present invention. The transceiver node 22 includes a first unit 11 of the baseband processing apparatus and a radio frequency unit 24, where the radio frequency unit 24 is configured to implement generating and receiving and sending a radio signal, and the first unit 11 of the transceiver node 22 and the second unit 15 of the central processing node 21 implement different baseband processing functions.

As another embodiment, optionally, as shown in FIG. 2B, the radio communication system 20 includes a central processing node 21 and a transceiver node 22. The central processing node 21 includes a first unit 11 and a second unit 15 of the baseband processing apparatus 10, a functional unit of MAC layer and/or upper layer 23, and a radio frequency unit 24, where the functional unit of MAC layer and/or upper layer 23 of the central processing node 21 is configured to implement a protocol function of a non-physical layer, the radio frequency unit 24 is configured to implement generating and receiving and sending a radio signal, and the first unit 11 and the second unit 15 of the central processing node 21 implement different baseband processing functions. The transceiver node 22 includes a first unit 11 of the baseband processing apparatus 10, a radio frequency unit 24, and a functional unit of MAC layer and/or upper layer 23, where the functional unit of MAC layer and/or upper layer 23 of the transceiver node 22 is configured to implement a protocol function of a non-physical layer, the radio frequency unit 24 is configured to implement generating and receiving and sending a radio signal, and the first unit 11 of the transceiver node 22 and the second unit 15 of the central processing node 22 implement different baseband processing functions.

Optionally, the first unit 11 and the second unit 15 are interconnected through a network such as an IP network, an Ethernet network, a passive optical network (PON), or a wavelength division multiplexing (WDM).

With reference to FIG. 1B and FIG. 2A, or FIG. 1B and FIG. 2B, in this radio communication network architecture, a downlink CoMP implementing process of the embodiment of the present invention includes the following content.

(1) The central processing node instructs, according to user information that needs joint downlink sending, the transceiver node to upload user channel state information to the central processing node, where the user channel state information (CSI) may be information such as a channel coefficient explicitly fed back by a terminal, or information implicitly fed back by the terminal such as precoding matrix indicator information and a channel rank, or a downlink channel coefficient obtained in a TDD system through estimation using channel reciprocity and based on an uplink SRS.

Figure 6:
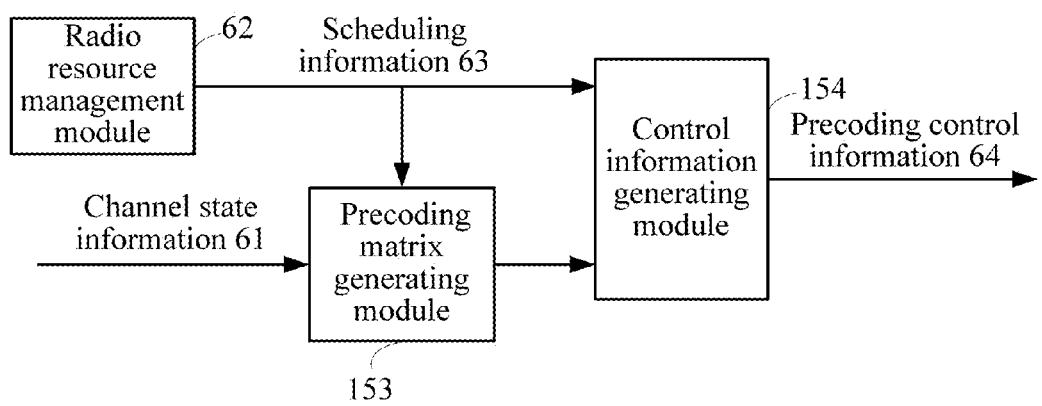
FIG. 6 is a schematic diagram of a method for generating a precoding matrix and precoding control information according to an embodiment of the present invention.

(2) As shown in FIG. 6, a precoding matrix generating module 153 of the central processing node generates a precoding matrix of a downlink CoMP user using the obtained user channel state information 61 and scheduling information 63 output by a radio resource management (RRM) module 62, which is also referred to as a CoMP precoding matrix and is abbreviated as precoding matrix in the context. For example, there are 7 transceiver nodes, each transceiver node has 4 antennas, 6 data streams are jointly sent, and a 28×6 precoding matrix is generated. The scheduling information 63, for example, includes user information included in the downlink CoMP, an occupied time-and-frequency resource, and a used antenna, which may be output by the RRM module. FIG. 6 is a schematic diagram of a method for generating a precoding matrix and precoding control information according to an embodiment of the present invention.

Optionally, the precoding matrix generating module 153 performs different operations according to different input user channel state information. If a channel matrix has not been generated yet, the channel matrix is first generated according to the input user channel state information 61, and then the precoding matrix is generated according to the channel matrix. For brevity, this manner is omitted in the drawing.

3) As shown in FIG. 6, the control information generating module 154 of the central processing node generates precoding control information 64 for each downlink CoMP transceiver node using the precoding matrix generated by the precoding matrix generating module 153 and the scheduling information 63, the precoding control information is sent together with downlink CoMP user data to each transceiver node through the sending module of the central processing node, where the precoding control information 64 may include a precoding matrix vector and instruction information. The precoding matrix vector is a vector extracted from the precoding matrix and corresponding to each antenna of a downlink CoMP transceiver node. The instruction information is a part of the scheduling information, and is used for instructing the coding and decoding module of the first unit to perform precoding on the downlink CoMP user data, generate precoding data and map the precoding data to a corresponding time-and-frequency resource. For example, in a scenario where each transceiver node has 4 antennas, for 6 data streams, a size of the precoding matrix vector is 4×6, and the instruction information includes a downlink CoMP user data instruction, a code word number, and a demodulation reference signal (DMRS) port number.

Optionally, as another implementation manner, the precoding control information 64 may include a whole precoding matrix and instruction information. After the whole precoding matrix generated by the precoding matrix generating module of the central processing node is sent to the transceiver node, the coding and decoding module of the transceiver node performs precoding, extracts, according to the precoding control information, data after encoding that corresponds to each antenna of the transceiver node, and maps the data to a corresponding time-and-frequency resource.

As an optional embodiment, the control information generating module 154, as a functional module, may be included in the first unit, or may be included in the second unit. For brevity, only an example where the second unit includes the control information generating module is taken here for description with drawings.

(4) The transceiver node codes and modulates the downlink CoMP user data, then the coding and decoding module of the transceiver node performs precoding on corresponding downlink CoMP user data according to the received precoding control information of a downlink CoMP user, and finally, baseband data for jointly sending is generated.

In addition, in this radio communication network architecture, an uplink CoMP implementing process of the embodiment of the present invention includes the following content.

The central processing node instructs the transceiver node to detach the uplink CoMP user data and upload the uplink CoMP user data through the sending module of the transceiver node. The uplink CoMP user data here refers to frequency domain data of an uplink CoMP user. The receiving module of the central processing node receives the frequency domain data of the uplink CoMP user, and the demodulation module and the decoding module of the central processing node perform joint demodulation and decoding on the received frequency domain data of the uplink CoMP user.

The first unit of the baseband processing apparatus performs downlink baseband processing on downlink non-CoMP user data in downlink user data obtained from a network side, so as to generate baseband data for radio sending, where the downlink baseband processing includes, for example, processing such as channel encoding, modulation, precoding, resource mapping, fast Fourier transform (FFT), and Cyclic Prefix (CP) insertion. Correspondingly, the first unit performs uplink baseband processing on uplink non-CoMP user data in uplink user data received from an air interface, and sends data obtained after processing to the functional unit of MAC layer and/or upper layer, where the functional unit of MAC layer and/or upper layer is configured to implement a protocol function of a non-physical layer, and the uplink baseband processing includes, for example, processing such as CP remove, inverse fast Fourier transform (IFFT), resource de-mapping, demodulation, and decoding. The foregoing processes of performing uplink baseband processing and downlink baseband processing on non-CoMP user data is the same as those in the prior art, and to highlight JP on the uplink and downlink CoMP user data in the embodiment of the present invention, specific details of the uplink and downlink processing procedures on the non-CoMP user data and the corresponding functional modules are omitted here. In this way, the baseband processing on the non-CoMP user data may all be performed by the first unit, and the first unit further performs precoding on the downlink CoMP user data at the same time, the second unit is not involved, and the data is directly sent through the radio frequency unit, thereby reducing data traffic between the first unit and the second unit. It is known above that, downlink precoding control information and uplink CoMP user data are transmitted between the first unit and the second unit, and the transmission bandwidth is much less than a transmission bandwidth required in transmission of pre-coded data between the first unit and the second unit.

FIG. 3 is a schematic flow chart of a baseband processing method 30 in a radio communication system according to an embodiment of the present invention.

S31: When an apparatus using the baseband processing method includes a first unit and a second unit that implement different baseband processing functions, the second unit generates a precoding matrix of a downlink CoMP user, generates precoding control information according to the precoding matrix, and sends the precoding control information to the first unit.

S32: The first unit receives the precoding control information sent by the second unit, obtains uplink user data and downlink user data, and performs downlink joint baseband processing on downlink CoMP user data in the downlink user data according to the precoding control information sent by the second unit, so as to generate jointly sent baseband data for sending.

S33: The first unit sends uplink CoMP user data in the uplink user data to the second unit.

S34: The second unit completes uplink joint baseband processing on the uplink CoMP user data sent by the first unit, so as to generate uplink transmission user data for non-physical layer processing, and, to generate uplink transmission user data for a functional unit of MAC layer and/or upper layer to perform non-physical layer processing, and generates the precoding matrix of the downlink CoMP user, generates the precoding control information according to the precoding matrix, and sends the precoding control information to the first unit.

The embodiment of the present invention provides a baseband processing method, where a CoMP baseband processing function is implemented in coordination through the first unit and the second unit in the apparatus using the method and according to the architecture of the first unit and the second unit of the baseband processing apparatus, thereby reducing interference between cells and improving system frequency spectrum efficiency, particularly in throughput of edge users, and obtaining a system capacity gain. Meanwhile, the baseband processing is implemented by two units, so that a radio communication system using the apparatus can reduce a transmission bandwidth between two baseband processing units with the minimum transmission traffic, thereby greatly reducing a requirement on transmission bandwidth.

Optionally, the method further includes that the first unit performs downlink baseband processing on downlink non-CoMP user data in the downlink user data obtained from a network side, so as to generate baseband data for radio sending; or the first unit performs uplink baseband processing on uplink non-CoMP user data in the uplink user data received from an air interface, and sends data obtained after processing to the functional unit of MAC layer and/or upper layer, where the functional unit of MAC layer and/or upper layer is configured to implement a protocol function of a non-physical layer.

Optionally, the first unit includes a receiving module, a coding and decoding module, and a sending module. That the first unit performs downlink joint baseband processing on downlink CoMP user data in the downlink user data according to the precoding control information sent by the second unit, so as to generate jointly sent baseband data for sending includes that the receiving module of the first unit receives the downlink CoMP user data in the downlink user data and the precoding control information sent by the second unit; the coding and decoding module of the first unit performs precoding processing according to the downlink CoMP user data in the downlink user data and the precoding control information sent by the second unit and received by the receiving module, so as to generate the jointly sent baseband data for radio sending; and the sending module of the first unit sends the uplink CoMP user data in the uplink user data before demodulation to the second unit.

Optionally, the second unit includes a receiving module, a demodulation module, a decoding module, a precoding matrix generating module, a control information generating module, and a sending module. That the second unit completes uplink joint baseband processing on the uplink CoMP user data sent by the first unit, so as to generate user data for a functional unit of MAC layer and/or upper layer to perform non-physical layer processing includes the receiving module of the second unit receives the uplink CoMP user data sent by the first unit; the demodulation module demodulates the uplink CoMP user data received by the receiving module and sends data after demodulation to the decoding module; the decoding module decodes the data after demodulation that is sent by the demodulation module, and sends data after decoding to the functional unit of MAC layer and/or upper layer, where the functional unit of MAC layer and/or upper layer is configured to implement the protocol function of the non-physical layer.

Optionally, that the second unit generates the precoding matrix of the downlink CoMP user, generates the precoding control information according to the precoding matrix, and sends the precoding control information to the first unit includes the precoding matrix generating module generates a CoMP precoding matrix according to user channel state information and sends the CoMP precoding matrix to the control information generating module; the control information generating module generates the precoding control information according to the CoMP precoding matrix, and sends the precoding control information to the sending module; and the sending module sends the precoding control information to the first unit.

Optionally, the user channel state information includes one or more of the following information: a channel coefficient fed back by a terminal, precoding matrix indicator information fed back by the terminal, channel rank indicator information fed back by the terminal, and a downlink channel coefficient estimated using channel reciprocity and according to an uplink SRS sent by the terminal.

Optionally, the first unit and the second unit are interconnected through an IP network, an Ethernet network, a PON or a WDM network.

Optionally, a radio communication system includes a central processing node and a transceiver node, where the central processing node includes a second unit of the baseband processing apparatus and a functional unit of MAC layer and/or upper layer, where the functional unit of MAC layer and/or upper layer of the central processing node is configured to implement a protocol function of a non-physical layer; and the transceiver node includes a first unit of the baseband processing apparatus and a radio frequency unit, where the radio frequency unit is configured to receive joint sent baseband data generated by the first unit, so as to generate a radio signal and receive and send a radio signal, the first unit of the transceiver node and the second unit of the central processing node implement different baseband processing functions, and the functional unit of MAC layer and/or upper layer is further configured to receive, from the second unit, uplink CoMP user data that has undergone joint baseband processing, receive, from the first unit, uplink non-CoMP user data that has undergone uplink baseband processing, and send downlink CoMP user data and downlink non-CoMP user data to the first unit.

Optionally, a radio communication system includes a central processing node and a transceiver node, where the central processing node includes a first unit and a second unit of the baseband processing apparatus, a functional unit of MAC layer and/or upper layer, and a radio frequency unit, where the functional unit of MAC layer and/or upper layer of the central processing node is configured to implement a protocol function of a non-physical layer, and is further configured to receive, from the second unit, uplink CoMP user data that has undergone joint baseband processing, receive, from the first unit of the central processing node, uplink non-CoMP user data that has undergone uplink baseband processing, and send downlink CoMP user data and downlink non-CoMP user data to the first unit of the central processing node, the radio frequency unit is configured to implement generating and receiving and sending of a radio signal, and the first unit and the second unit of the central processing node are configured to implement different baseband processing functions; and the transceiver node includes a first unit of the baseband processing apparatus, a radio frequency unit, and a functional unit of MAC layer and/or upper layer, where the functional unit of MAC layer and/or upper layer of the transceiver node is configured to implement a protocol function of a non-physical layer, and is further configured to receive, from the second unit, uplink CoMP user data that has undergone joint baseband processing, receive, from the first unit of the transceiver node, uplink non-CoMP user data that has undergone uplink baseband processing, and send non-CoMP user data in downlink user data to the first unit of the transceiver node, the radio frequency unit is configured to implement generating and receiving and sending of a radio signal, and the first unit of the transceiver node and the second unit of the central processing node are configured to implement different baseband processing functions.

Next, for ease of description, a radio communication system is selected for description of the baseband processing method of the embodiment of the present invention, where an LTE system is taken as an example, but it is not limited in the present invention.

Figure 4:
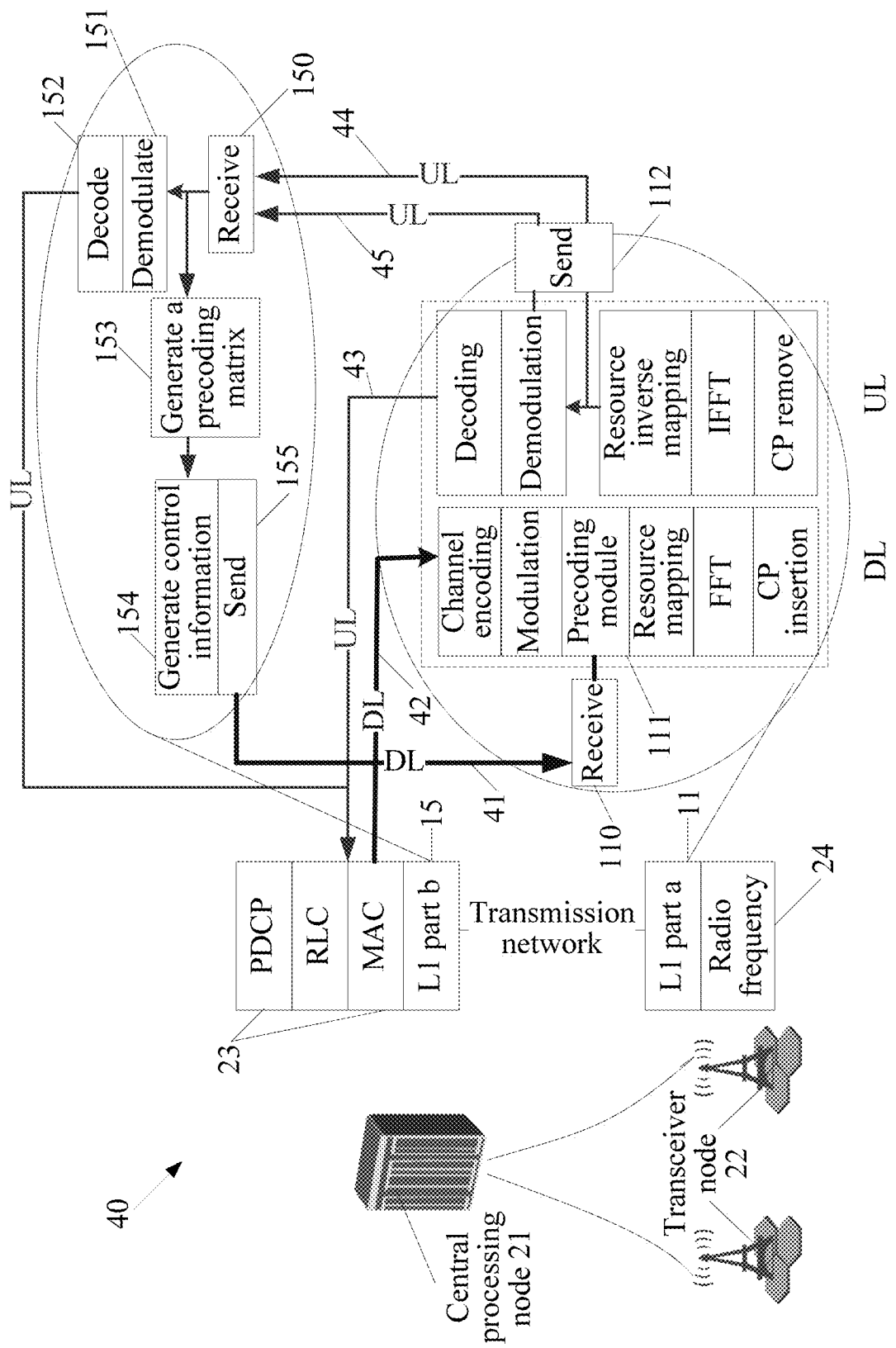
FIG. 4 is a schematic diagram of a baseband processing method in a radio communication system according to an embodiment of the present invention.

FIG. 4 is a schematic diagram of a baseband processing method in a radio communication system according to an embodiment 40 of the present invention. In an application scenario of FIG. 4, the radio communication system includes one central processing node and multiple transceiver nodes. For clear description, the radio communication system in FIG. 2A is taken as an example. Only a transceiver node includes a radio frequency unit, and only the central processing node includes a functional unit of MAC layer and/or upper layer.

A second unit of the central processing node is also referred to as a functional module L1 part b in the context. The functional unit of MAC layer and/or upper layer of the central processing node is indicated, for brevity, with a reference numeral 23 in this specification. In a specific implementation manner, as shown in FIG. 4, the functional unit of MAC layer and/or upper layer may include multiple specific units, such as, a MAC unit, a radio link control (RLC) unit, and a packet data convergence protocol (PDCP) unit.

A first unit of the transceiver node is also referred to as a functional module L1 part a in the context, and a coding and decoding module included in the first unit further includes some specific sub-modules in the prior art, implementing a baseband processing function. For example, as shown in FIG. 4, the coding and decoding module of the first unit of the transceiver node implements, in the downlink DL, channel encoding, modulation, precoding, resource mapping, FFT, CP insertion and so on. The coding and decoding module of the first unit of the transceiver node implements, in the uplink (UL), CP remove, IFFT, resource inverse mapping, demodulation, decoding and so on. Correspondingly, each processing process may be implemented by one or more sub-units, which are not described here in the embodiment of the present invention.

A transmission network of the second unit of the central processing node and first units of the multiple transceiver nodes may be an IP network, an Ethernet network, a PON or a WDM network. Next, uplink and downlink interaction between the central processing node and the transceiver nodes are described.

Referring to FIG. 4, a downlink direction includes precoding control information 41 of a downlink CoMP user generated by a control information generating module 154, and downlink user data and scheduling information 42. The precoding control information includes a precoding matrix vector and instruction information from the scheduling grant for downlink CoMP user data, and the instruction information includes a downlink CoMP user data instruction, a code word number, and a DMRS port number.

An uplink direction includes a data stream after decoding of an uplink non-CoMP user 43, frequency domain data before decoding of the uplink CoMP user 44, and user channel state information 45. Optionally, the user channel state information 45 may be included in the frequency domain data 44 or be obtained through estimation according to information in the frequency domain data 44.

In the uplink, after resource inverse mapping of the first unit, the frequency domain data 44 is obtained, and a sending module of the transceiver node uploads the frequency domain data 44 of the uplink CoMP user before decoding and after detaching to the central processing node. Meanwhile, the first unit continues baseband demodulation and precoding processing on an uplink non-CoMP user data, and sends data to the functional unit of MAC layer and/or upper layer. The process is the same as the processing method of the prior art. A demodulation module and a decoding module of the second unit perform joint baseband demodulation and decoding processing on the received frequency domain data 44 of the uplink CoMP user.

User channel state information sent by the first unit to the second unit may be obtained through the following several methods.

As shown by the frequency domain data 44 of FIG. 4, if a terminal feeds back the user channel state information, for example, a channel coefficient, precoding matrix indicator information, and/or channel rank indicator information, the first unit demodulates and decodes the user channel state information, and then uploads the user channel state information; or after the resource inverse mapping of the first unit, the first unit separates the channel state information of the users from uplink data in frequency domain and sends them to the second unit, and the second unit demodulates and obtain the channel state information of the users; or in a TDD system, a user sends an uplink SRS, after the resource inverse mapping, the first unit separates the SRS signal from uplink data in frequency domain and sends them to the second unit, and the second unit, and the second unit performs channel estimation, so as to obtain an uplink or a downlink channel coefficient. Optionally, in the TDD system, if a user sends an uplink SRS, data of the SRS is detached through the resource inverse mapping of the first unit, and after performing channel estimation, the first unit may upload to the second unit a channel coefficient obtained through estimation, as shown by user channel state information 45 of FIG. 4.

In the TDD system, the uplink and downlink channel states are the same, and this feature is also referred to as channel reciprocity. Therefore, the obtained uplink channel state information is downlink channel state information.

It is known above that, the downlink precoding control information and the uplink CoMP user data are transmitted between the first unit and the second unit, and the transmission bandwidth is much less than a transmission bandwidth required in transmission of pre-coded data between the first unit and the second unit. In the embodiment of the present invention, a CoMP baseband processing function is implemented in coordination using the first unit of the transceiver node and the second unit of the central processing node and according to the architecture of the first unit and the second unit, thereby reducing interference between cells and improving system frequency spectrum efficiency, particularly in throughput of edge users, and obtaining a system capacity gain. Meanwhile, the baseband processing is implemented by two units, so that a radio communication system using the apparatus can reduce a transmission bandwidth between two baseband processing units with the minimum transmission traffic, thereby greatly reducing a requirement on transmission bandwidth.

In the embodiment of the present invention, a bandwidth required by the transmission network between the first unit and the second unit is different from that of a transmission network between a BBU and a RRU, which is decided by the architecture of the first unit and the second unit for baseband processing in the embodiment of the present invention, thereby avoiding an excessively high requirement on the network transmission bandwidth between the BBU and the RRU.

The embodiment of the present invention is preferably applicable to a scenario with central processing and small bandwidth requirement on access network. The uplink and downlink CoMP is implemented between units of the baseband processing apparatus with the minimum transmission traffic, and the deployment cost of the CoMP is reduced.

Figure 5:
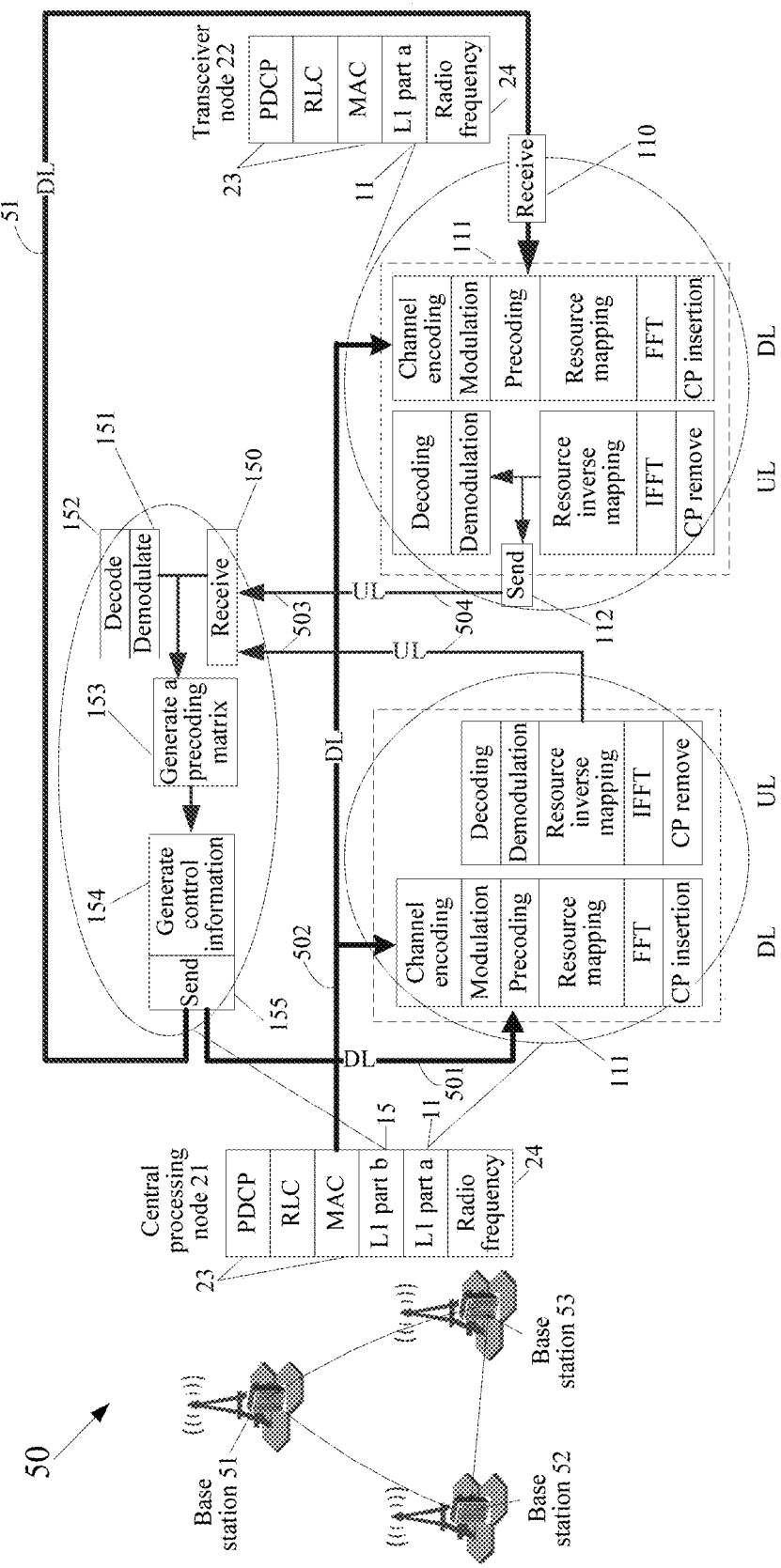
FIG. 5 is a schematic diagram of a baseband processing method in a radio communication system according to another embodiment of the present invention.

Optionally, different from the application scenario of the embodiment 40, the radio communication system may further include an application scenario of FIG. 5. FIG. 5 is a schematic diagram of a baseband processing method in a radio communication system according to another embodiment 50 of the present invention. The architecture of the radio communication system of the embodiment 50 includes multiple base stations, for example, base stations 51 to 53.

The application scenario of the embodiment 50 mainly includes the following two scenarios: one is a base station convergence scenario of a macro base station and a small base station, where the small base station is directly connected to the macro base station through an X2 interface or another interface, small base station user data is transmitted transparently through the macro base station, the macro base station is defined as a central processing node, and the small base station is defined as a transceiver node; and the other is a scenario of peer-to-peer distributed base stations, where the base stations are interconnected through an X2 interface or another interface, and in this scenario, a base station generating a precoding matrix is defined as a central processing node, and the remaining base stations are defined as transceiver nodes. Both the central processing node and the transceiver node have functions of a physical layer, a MAC layer and an upper layer. The difference lies in that, the central processing node has a complete physical layer function, that is, can implement a baseband function including CoMP processing, and includes a second unit (L1 part b) 15 and a first unit (L1 part a) 11, while the transceiver node does not have a complete physical layer function for CoMP processing, and only includes the first unit (L1 part a) 11, and cannot complete the CoMP processing independently, for which reference is made to the central processing node and the transceiver node shown in the radio communication system of FIG. 2B.

Different from the scenario of the embodiment 40, in the scenario of the embodiment 50, uplink non-CoMP user data is directly sent to a network node such as an RNC or an access gateway AGW after being processed by the transceiver node, while uplink CoMP user data is sent to the RNC or AGW after being processed by the central processing node. For brevity, a process of sending data to the RNC or AGW is not shown in FIG. 5. In the base station convergence scenario, downlink non-CoMP user data in downlink user data and scheduling information 502 is transmitted transparently by the central processing node to the transceiver node, while downlink CoMP user data and precoding control information 501, which includes a downlink CoMP precoding matrix and all related control information, are sent by the central processing node to the transceiver node for precoding processing. In the peer-to-peer distributed base station scenario, because user data does not pass through the same node, downlink CoMP user data needs to be sent before precoding, through an interface of a base station, to all transceiver nodes and the central processing node that are involved in downlink CoMP. If 3 base stations are involved in the downlink CoMP, for example, the base stations 51 to 53 shown in FIG. 5, downlink CoMP data of the base station 51 needs to be sent to the base stations 52 and 53. Similarly, downlink CoMP data of the base station 52 needs to be sent to the base stations 51 and 53, and downlink CoMP data of the base station 53 needs to be sent to the base stations 51 and 52.

Similar to the embodiment 40, frequency domain data before decoding of an uplink CoMP user 503 and user channel state information 504 shown in FIG. 5 are sent from a first unit of a base station acting as the transceiver node and a first unit in a base station acting as the central processing node to a second unit of the central processing node. To highlight a case where the first unit of transceiver node and the second unit of the central processing node are connected through a transmission network such as an IP network, receiving modules and sending modules at two sides are shown in FIG. 5. For simplification, the connection between the first unit and the second unit of the base station acting as the central processing node is the same as that in the prior art, which is not described herein.

It is known above that, the downlink precoding control information and the uplink CoMP user data are transmitted between the first unit and the second unit, and the transmission bandwidth is much less than a transmission bandwidth required in transmission of pre-coded data between the first unit and the second unit. In the embodiment of the present invention, a CoMP baseband processing function is implemented in coordination using the first unit of the transceiver node and the first unit and the second unit of the central processing node and according to the architecture of the first unit and the second unit, thereby reducing interference between cells and improving system frequency spectrum efficiency, particularly in throughput of edge users, and obtaining a system capacity gain. Meanwhile, the baseband processing is implemented by two units, so that a radio communication system using the apparatus can reduce a transmission bandwidth between two baseband processing units with the minimum transmission traffic, thereby greatly reducing a requirement on transmission bandwidth. The embodiment of the present invention is preferably applicable to the scenario with a low transmission bandwidth between the baseband processing units and the processing unit of MAC layer and/or upper layer, and requiring implementing the CoMP. The uplink and downlink CoMP is implemented between baseband processing units with the minimum transmission traffic, and the deployment cost of the CoMP is reduced.

The first unit and the second unit of the baseband processing apparatus 10 implement the method 30 and the embodiments 40 and 50 in the radio communication system 20, and for brevity, specific details are not described here again.

In addition, the embodiments of the present invention further provide three baseband data processing methods, and for specific details, reference may be made to embodiments of FIG. 4 and FIG. 5.

Optionally, another embodiment of the present invention provides a baseband data processing method for processing baseband data in a radio communication system, where the method includes generating, through a second unit, a precoding matrix of a downlink CoMP user, and generating precoding control information according to the precoding matrix; sending the precoding control information to a first unit, where the first unit and the second unit are set independently; performing, using the first unit, downlink joint baseband processing on downlink CoMP user data in downlink user data according to the precoding control information, so as to generate jointly sent baseband data for radio sending; and sending, using the first unit, uplink CoMP user data in uplink user data to the second unit, and completing, using the second unit, uplink joint baseband processing on the uplink CoMP user data sent by the first unit, so as to generate user data for a functional unit of MAC layer and/or upper layer to perform non-physical layer processing. The method includes that the second unit demodulates the uplink CoMP user data, so as to obtain data after demodulation; and the second unit decodes the data after demodulation, so as to send data after decoding to the functional unit of MAC layer and/or upper layer, where the functional unit of MAC layer and/or upper layer is configured to implement a protocol function of a non-physical layer.

Optionally, still another embodiment of the present invention provides a baseband data processing method for processing baseband data in a radio communication system, where the method includes generating a precoding matrix of a downlink CoMP user, generating precoding control information according to the precoding matrix, and sending the precoding control information to a first unit, so that the first unit performs downlink joint baseband processing on downlink CoMP user data in downlink user data according to the precoding control information, so as to generate jointly sent baseband data for radio sending; and receiving uplink CoMP user data in uplink user data sent by the first unit, and completing uplink joint baseband processing on the uplink CoMP user data sent by the first unit, so as to generate user data for a functional unit of MAC layer and/or upper layer to perform non-physical layer processing. The completing uplink joint baseband processing on the uplink CoMP user data sent by the first unit includes demodulating the uplink CoMP user data, so as to obtain data after demodulation; and decoding the data after demodulation, so as to send data after decoding to the functional unit of MAC layer and/or upper layer, where the functional unit of MAC layer and/or upper layer is configured to implement a protocol function of a non-physical layer.

Optionally, still another embodiment of the present invention provides a baseband data processing method for processing baseband data in a radio communication system, where the method includes receiving precoding control information sent by a second unit, and performing downlink joint baseband processing on downlink CoMP user data in downlink user data according to the precoding control information, so as to generate jointly sent baseband data for radio sending; and sending uplink CoMP user data in uplink user data to the second unit, so that uplink joint baseband processing on the uplink CoMP user data sent by the first unit is completed, so as to generate user data for a functional unit of MAC layer and/or upper layer to perform non-physical layer processing. The performing downlink joint baseband processing on downlink CoMP user data in downlink user data according to the precoding control information, so as to generate jointly sent baseband data for radio sending includes receiving the precoding control information sent by the second unit; and performing precoding processing according to the downlink CoMP user data in the downlink user data and the precoding control information, so as to generate the joint sent baseband data for radio sending.

Persons of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. Persons skilled in the art may use different methods to implement the described functions for each particular application, but it should not be considered that the implementation goes beyond the scope of the present invention.

Persons skilled in the art clearly understand that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, division of the units is merely logical function division and there may be other division manners in actual implementation. For example, a plurality of units or components may be combined or integrated into another system, or some features may be ignored or not performed. In addition, the displayed or discussed mutual couplings or direct couplings or communication connections may be implemented through some interfaces. Indirect couplings or communication connections between the apparatuses or units may be implemented in electronic, mechanical or other forms.

The units described as separate parts may be or may not be physically separate, and parts displayed as units may be or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such understanding, the technical solutions of the present invention essentially, or the part contributing to the prior art, or part of the technical solutions may be implemented in the form of a software product. The computer software product is stored in a storage medium, and includes several instructions for instructing a computer device (which may be a personal computer, a server, or a network device) to perform all or a part of the steps of the method described in the embodiment of the present invention. The storage medium includes various media that can store program codes, such as a universal serial bus (USB) flash disk, a removable hard disk, a read-only memory (ROM), a random access memory (RAM), a magnetic disk, or an optical disc.

The foregoing descriptions are merely specific embodiments of the present invention, but are not intended to limit the protection scope of the present invention. Any variation or replacements readily figured out by persons skilled in the art within the technical scope disclosed in the present invention shall fall within the protection scope of the present invention. Therefore, the protection scope of the present invention shall be subject to the protection scope of the claims.

What is claimed is:

1. A baseband processing apparatus in a radio communication system, comprising:
   a first unit comprising:
      a first processor;
      a first receiver coupled to the first processor; and
      a first transmitter coupled to the first processor,
      wherein the first unit is part of a transceiver node in the radio communication system; and
   a second unit coupled to the first unit and comprising:
      a second processor configured to:
         generate a precoding matrix of a downlink coordinated multipoint transmission and reception (CoMP) user data of a user equipment (UE); and
         generate precoding control information according to the precoding matrix; and
      a second receiver coupled to the second processor; and
      a second transmitter coupled to the second processor and configured to send the precoding control information to the first unit,
   wherein the second unit is part of a central processing node in the radio communication system,
   wherein the first receiver is configured to:
      receive the precoding control information sent by the second unit; and
      receive uplink user data and downlink user data of the UE, wherein the uplink user data is data sent from the UE to the first unit, and wherein the downlink user data is data sent from the second unit to the first unit;
   wherein the first processor is configured to perform downlink joint baseband processing on the downlink CoMP user data in the downlink user data according to the precoding control information to generate jointly sent baseband data;
   wherein the first transmitter is configured to send uplink CoMP user data in the uplink user data to the second receiver, and
   wherein the second processor is further configured to complete uplink joint baseband processing on the uplink CoMP user data sent by the first unit to generate uplink transmission user data for non-physical layer processing and to generate uplink transmission user data for a functional unit of media access control (MAC) layer or upper layer to perform non-physical layer processing.

2. The baseband processing apparatus according to claim 1, wherein the first receiver is further configured to:
   receive the precoding control information sent by the second transmitter; and
   receive the downlink user data,
   wherein the first processor is further configured to:

perform precoding processing according to the downlink CoMP user data in the downlink user data and the precoding control information sent by the second transmitter and received by the first receiver; and
generate the jointly sent baseband data, and obtain the uplink user data, and
wherein the second transmitter is further configured to send the uplink CoMP user data in the uplink user data before demodulation.

3. The baseband processing apparatus according to claim 1, wherein the second receiver is configured to receive the uplink CoMP user data sent by the first transmitter,
wherein the second processor is further configured to:
demodulate the uplink CoMP user data;
decode the data after demodulation, wherein the functional unit of MAC layer or the upper layer is configured to implement a protocol function of a nonphysical layer;
generate a CoMP precoding matrix according to user channel state information; and
generate the precoding control information according to the CoMP precoding matrix,
wherein the second transmitter is configured to send the precoding control information to the first receiver.

4. The baseband processing apparatus according to claim 3, wherein the user channel state information comprises at least one of a channel coefficient fed back by the UE, a precoding matrix indicator information fed back by the UE, a channel rank indicator information fed back by the UE, and a downlink channel coefficient estimated using channel reciprocity and according to an uplink sounding reference signal (SRS) sent by the UE.

5. The baseband processing apparatus according to claim 1, wherein the first processor further configured to:
perform downlink baseband processing on downlink non-COMP user data in the downlink user data obtained from a network side to generate baseband data; and
perform uplink baseband processing on uplink non-CoMP user data in the uplink user data received from an air interface,
wherein the first transmitter is further configured to send data obtained after processing to the functional unit of MAC layer or the upper layer that is configured to implement a protocol function of a non-physical layer.

6. The baseband processing apparatus according to claim 1, wherein the first unit and the second unit are interconnected through at least one of an international Internet protocol (IP) network, an Ethernet network, a passive optical network (PON), and a wavelength division multiplexing (WDM) network.

7. A radio communication system comprising:
a central processing node (CPN) comprising:
at least one CPN processor configured to implement instructions associated with:
a second unit; and
a functional unit of media access control (MAC) layer or upper layer configured to implement a protocol function of a non-physical layer; and
a transceiver node comprising:
a first unit; and
a radio frequency unit,
wherein the second unit is configured to:
generate a precoding matrix of a downlink coordinated multipoint transmission and reception (CoMP) user data of a user equipment (UE); and
generate precoding control information according to the precoding matrix,
wherein the second unit comprises a second transmitter coupled to the at least one CPN processor and configured to send the precoding control information to the first unit,
wherein the first unit comprises a first receiver configured to:
receive the precoding control information sent by the second unit; and
obtain uplink user data and downlink user data of the UE, wherein the uplink user data is data sent from the UE to the first unit, and wherein the downlink user data is data sent from the second unit to the first unit;
wherein the first unit further comprises a first processor coupled to the first receiver and configured to:
perform downlink joint baseband processing on the downlink CoMP user data in the downlink user data according to the precoding control information; and
generate jointly sent baseband data,
wherein the first unit further comprises a first transmitter coupled to the first processor and configured to send uplink CoMP user data in the uplink user data to the second unit, and
wherein the at least one CPN processor is further configured to:
complete uplink joint baseband processing on the uplink CoMP user data sent by the first unit;
generate uplink transmission user data for non-physical layer processing;
generate uplink transmission user data for the functional unit of media access control (MAC) layer or the upper layer to perform non-physical layer processing;
generate the precoding matrix of the downlink CoMP user data; and
generate the precoding control information according to the precoding matrix; and
wherein the second transmitter is further configured to send the precoding control information to the first unit,
wherein the radio frequency unit is configured to receive joint sent baseband data generated by the first unit to generate a radio signal and receive and send the radio signal,
wherein the functional unit of MAC layer or the upper layer is further configured to:
receive, from the second unit, uplink CoMP user data that has undergone joint baseband processing;
receive, from the first unit, uplink non-CoMP user data that has undergone uplink baseband processing; and
send downlink CoMP user data and downlink non-CoMP user data to the first unit.

8. The radio communication system according to claim 7, wherein the first receiver is further configured to:
receive the precoding control information sent by the second transmitter; and
obtain the downlink user data and the uplink user data,
wherein the first processor is further configured to perform precoding processing according to the downlink CoMP user data in the downlink user data and the precoding control information sent by the second unit to generate the jointly sent baseband data, and wherein the first transmitter is further configured to send the uplink CoMP user data in the uplink user data before demodulation.

9. The radio communication system according to claim 7, wherein a second receiver of the second unit is further configured to receive the uplink COMP user data sent by the first unit,
wherein the at least one CPN processor is further configured to
demodulate the uplink CoMP user data;
decode the data after demodulation;
generate a CoMP precoding matrix according to user channel state information; and
generate the precoding control information according to the CoMP precoding matrix, and
wherein the second transmitter is further configured to send the preceding control information to the first unit.

10. The radio communication system according to claim 9, wherein the user channel state information used by the precoding matrix generating module of the second unit comprises at least one a channel coefficient fed back by the UE, a preceding matrix indicator information fed back by the UE, a channel rank indicator information fed back by the UE, and a downlink channel coefficient estimated using channel reciprocity and according to an uplink sounding reference signal (SRS) sent by the UE.

11. The radio communication system according to claim 7, wherein the first processor is further configured to:
perform downlink baseband processing on downlink non-CoMP user data in the downlink user data obtained from a network side to generate baseband data; and
perform uplink baseband processing on uplink non-COMP user data in the uplink user data received from an air interface,
wherein the first transmitter is further configured to send data obtained after processing to the functional unit of MAC layer or upper layer, and
wherein the functional unit of MAC layer or upper layer is configured to implement a protocol function of a non-physical layer.

12. The radio communication system according to claim 7, wherein the first unit and the second unit are interconnected through at least one of an international Internet Protocol (IP) network, an Ethernet network, a passive optical network (PON), and a wavelength division multiplexing (WDM) network.

13. A radio communication system comprising:
a central processing node (CPN) comprising:
at least one CPN processor configured to execute instructions associated with:
a CPN first unit comprising:
a CPN first unit transmitter; and
a CPN first unit receiver;
a CPN functional unit of media access control (MAC) layer or upper layer;
a CPN radio frequency unit; and
a CPN second unit comprising:
a CPN second unit transmitter; and
a CPN second unit receiver; and
a transceiver node (TN) comprising:
at least one TN processor configured to execute instructions associated with:
a TN first unit;
a TN radio frequency unit; and
a TN functional unit of MAC layer or the upper layer,
wherein the CPN second unit is configured to:
generate a precoding matrix of a downlink coordinated multipoint transmission and reception (CoMP) user data of a user equipment (UE); and
generate precoding control information according to the precoding matrix
wherein the CPN second unit transmitter is configured to send the precoding control information to the CPN first unit receiver,
wherein the CPN first unit receiver is configured to:
receive the precoding control information sent by the CPN second unit transmitter;
receive uplink user data and downlink user data of the UE, wherein the uplink user data is data sent from the UE to the CPN first unit, and wherein the downlink user data is data sent from the CPN second unit to the CPN first unit;
wherein the CPN first unit is configured to perform downlink joint baseband processing on downlink CoMP user data in the downlink user data according to the precoding control information to generate jointly sent baseband data; and
wherein the CPN first unit transmitter is configured to send uplink CoMP user data in the uplink user data to the CPN second unit receiver, and
wherein the CPN second unit is further configured to:
complete uplink joint baseband processing on the uplink CoMP user data sent by the CPN first unit to generate uplink transmission user data for nonphysical layer processing and to generate uplink transmission user data for the CPN functional unit of MAC layer or the upper layer to perform non-physical layer processing;
generate the precoding matrix of the downlink CoMP user data; and
generate the precoding control information according to the precoding matrix; and
wherein the CPN second unit transmitter is further configured to send the precoding control information to the CPN first unit,
wherein the CPN functional unit of MAC layer or the upper layer is configured to:
implement a protocol function of a non-physical layer;
receive, from the CPN second unit, uplink CoMP user data that has undergone joint baseband processing;
receive, from the CPN first unit, uplink non-CoMP user data that has undergone uplink baseband processing; and
send the downlink CoMP user data and downlink non-CoMP user data to the CPN first unit,
wherein the CPN radio frequency unit is configured to implement generating and receiving and sending of a radio signal, and
wherein the TN functional unit of MAC layer or the upper layer is configured to:
implement a protocol function of the non-physical layer;
receive, from the CPN second unit, the uplink CoMP user data that has undergone joint baseband processing;
receive, from the TN first unit, the uplink non-CoMP user data that has undergone uplink baseband processing; and
send non-CoMP user data in downlink user data to the TN first unit.

14. A baseband data processing method for processing baseband data in a radio communication system, the method comprising:
obtaining uplink user data and downlink user data of a downlink coordinated multipoint transmission and reception (CoMP) user data of a user equipment (UE), wherein the uplink user data is data sent from the UE to a first unit, and wherein the downlink user data is data sent from a second unit to the first unit;

generating, by a second processor of the second unit, a precoding matrix of the downlink CoMP user data, wherein the second unit is associated with at least one of a central processing node and a base station;

generating precoding control information according to the precoding matrix;

sending the precoding control information to a first receiver of the first unit, wherein the first unit is part of a transceiver node;

performing, by a first processor coupled to the first receiver of the first unit, downlink joint baseband processing on the downlink CoMP user data in the downlink user data according to the precoding control information to generate jointly sent baseband data;

sending, by a transmitter of the first unit, uplink CoMP user data in the uplink user data to a second receiver of the second unit; and completing, by the second processor of the second unit, uplink joint baseband processing on the uplink CoMP user data sent by the transmitter of the first unit to generate uplink transmission user data for non-physical layer processing.

15. The method according to claim 14, wherein completing, using by the processor of the second unit, the joint baseband processing on the uplink CoMP user data sent by the transmitter of the first unit further comprises:

demodulating, by second processor of the second unit, the uplink CoMP user data, to obtain data after demodulation; and decoding, by the second processor of the second unit, the data after demodulation to send data after decoding to a functional unit of media access control (MAC) layer or upper layer, wherein the functional unit of MAC layer or the upper layer is configured to implement a protocol function of a non-physical layer.

16. A baseband data processing method for processing baseband data in a radio communication system at a second unit that is a part of a central processing node in the radio communication system, the method comprising:

generating a precoding matrix of a coordinated multipoint transmission and reception (CoMP) enabled user equipment;

generating precoding control information according to the precoding matrix;

sending the precoding control information to a receiver of a first unit such that a processor of the first unit performs downlink joint baseband processing on downlink CoMP user data in downlink user data according to the precoding control information to generate jointly sent baseband data, wherein the first unit is associated with a transceiver node;

receiving uplink CoMP user data in uplink user data sent by a transmitter of the first unit, wherein the transmitter of the first unit is communicatively coupled to a receiver of the second unit and transmits the uplink user data to the second unit; and completing uplink joint baseband processing on the uplink CoMP user data sent by the transmitter of the first unit to generate uplink transmission user data for non-physical layer processing.

17. The method according to claim 16, wherein completing the uplink joint baseband processing on the uplink CoMP user data sent by the transmitter of the first unit further comprises:

demodulating the uplink CoMP user data to obtain data after demodulation; and decoding the data after demodulation, to send data after decoding to a functional unit of MAC layer or upper layer, wherein the functional unit of MAC layer or upper layer is configured to implement a protocol function of a non-physical layer.

18. A baseband data processing method for processing baseband data in a radio communication system at a first unit that is a part of a transceiver node in the radio communication system, the method comprising:

receiving precoding control information sent by a transmitter of a second unit, wherein the second unit is associated with at least one of a central processing node and a base station;

performing downlink joint baseband processing on downlink coordinated multipoint transmission and reception (CoMP) user data in downlink user data according to the precoding control information to generate jointly sent baseband data; and sending uplink CoMP user data in uplink user data to a receiver of the second unit such that the second unit completes uplink joint baseband processing on the uplink CoMP user data sent by a transmitter of the first unit to generate uplink transmission user data for non-physical layer processing, and wherein the transmitter of the first unit is communicatively coupled to the receiver of the second unit and transmits the uplink user data to the second unit.

19. The method according to claim 18, wherein performing the downlink joint baseband processing on the downlink CoMP user data in the downlink user data according to the precoding control information to generate the jointly sent baseband data further comprises performing precoding processing according to the downlink CoMP user data in the downlink user data and the precoding control information to generate the jointly sent baseband data.

* * * * *

UNITED STATES PATENT AND TRADEMARK OFFICE
CERTIFICATE OF CORRECTION

PATENT NO. : 9,602,182 B2  
APPLICATION NO. : 14/598342  
DATED : March 21, 2017  
INVENTOR(S) : Jinfang Zhang et al.

Page 1 of 1

It is certified that error appears in the above-identified patent and that said Letters Patent is hereby corrected as shown below:

In the Claims

Column 23, Line 14, Claim 9 should read:
send the precoding control information to the first unit.

Column 23, Line 19, Claim 10 should read:
UE, a precoding matrix indicator information fed back by Signed and Sealed this
Sixteenth Day of May, 2017

Michelle K. Lee
*Director of the United States Patent and Trademark Office*